(12) United States Patent
Subba et al.

(10) Patent No.: US 10,129,375 B1
(45) Date of Patent: Nov. 13, 2018

(54) THIN SECTION INTERLOCK GEOMETRY FOR MOLDING PLASTIC

(71) Applicant: Microsoft Technology Licensing, LLC, Redmond, WA (US)

(72) Inventors: Chandrashekar Gernipalli Subba, Redmond, WA (US); Rohit Krishna Koppal, Sammamish, WA (US); Ronald Smith, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/592,875

(22) Filed: May 11, 2017

(51) Int. Cl.
*H04M 1/02* (2006.01)

(52) U.S. Cl.
CPC ....... *H04M 1/0249* (2013.01); *H04M 1/0274* (2013.01)

(58) Field of Classification Search
CPC .. H04M 1/0249; H04M 1/0274; H01Q 1/243; H01Q 1/244
USPC ............................................. 455/550.1, 90.1
See application file for complete search history.

(56) References Cited

U.S. PATENT DOCUMENTS

| | | | | |
|---|---|---|---|---|
| 3,936,120 A | * | 2/1976 | Schultz | H01R 24/52 439/559 |
| 4,005,524 A | * | 2/1977 | Schultz | H01R 24/52 29/882 |
| 4,711,361 A | * | 12/1987 | Mischenko | H05K 5/0008 220/345.1 |
| 4,945,362 A | * | 7/1990 | Keiser | H01Q 17/00 343/753 |
| 7,598,651 B2 | * | 10/2009 | Kornbluh | B64C 3/48 310/309 |
| 7,598,652 B2 | * | 10/2009 | Kornbluh | B64C 3/48 310/309 |

(Continued)

FOREIGN PATENT DOCUMENTS

| AU | 2010306869 A1 | 5/2012 |
|---|---|---|
| CN | 102337439 A | 2/2012 |

(Continued)

OTHER PUBLICATIONS

"Magnesium Injection Molding Design Guide", http://web.archive.org/web/*/http:/www.phillipsmedisize.com/sites/default/files/whitepaper/MAG_DesignGuide.pdf, Published on: Mar. 27, 2016, 32 pages.

(Continued)

*Primary Examiner* — Hai V Nguyen
(74) *Attorney, Agent, or Firm* — Alleman Hall Creasman & Tuttle LLP (57) ABSTRACT

To address the issue of securely joining thin sections of magnesium housing, a computing device with a housing, a metal strip, and a plastic interlock structure is provided. The housing may include adjacently arranged first and second metal sections separated by a void. The metal strip may have a hole with an undercut region formed therein, and it may be joined to a surface of one of the metal sections. The plastic interlock structure may be positioned at least partially in the void, and the metal strip may be embedded in the plastic interlock structure to strengthen the joint between the metal sections of the housing. The plastic interlock structure may physically and electrically isolate adjacent metal sections from one another to form an antenna that permits transmission of radio waves.

20 Claims, 8 Drawing Sheets

(56) References Cited

U.S. PATENT DOCUMENTS

| | | | |
|---|---|---|---|
| 7,947,900 B2 | 5/2011 | Cheng et al. | |
| 8,164,232 B2* | 4/2012 | Kornbluh | B64C 3/48 |
| | | | 310/309 |
| 8,338,703 B2 | 12/2012 | Crohas et al. | |
| 8,342,228 B2 | 1/2013 | Sanford et al. | |
| 8,436,508 B2* | 5/2013 | Kornbluh | B64C 3/48 |
| | | | 310/309 |
| 8,858,854 B2 | 10/2014 | Oin | |
| 8,861,198 B1 | 10/2014 | Asuncion | |
| 8,971,026 B2 | 3/2015 | Matsuoka | |
| 9,218,020 B1 | 12/2015 | Martinez et al. | |
| 9,387,612 B2 | 7/2016 | Weber et al. | |
| 9,409,379 B2 | 8/2016 | Lynch | |
| 9,427,941 B2 | 8/2016 | Feinstein | |
| 9,666,934 B2* | 5/2017 | Lombardi | H01Q 1/243 |
| 9,788,620 B1* | 10/2017 | Parkinson | A45C 11/00 |
| 2006/0192465 A1* | 8/2006 | Kornbluh | B64C 3/48 |
| | | | 310/309 |
| 2007/0202933 A1* | 8/2007 | Tolbert | B32B 17/10018 |
| | | | 455/575.1 |
| 2008/0075930 A1* | 3/2008 | Kornbluh | B64C 3/48 |
| | | | 428/189 |
| 2009/0280347 A1 | 11/2009 | Yu | |
| 2010/0007240 A1* | 1/2010 | Kornbluh | B64C 3/48 |
| | | | 310/309 |
| 2010/0314454 A1* | 12/2010 | Youn | G06K 19/0723 |
| | | | 235/492 |
| 2011/0042400 A1 | 2/2011 | Wang | |
| 2011/0056644 A1 | 3/2011 | Takashima et al. | |
| 2011/0222214 A1* | 9/2011 | Lan | B29C 45/1671 |
| | | | 361/679.01 |
| 2011/0228083 A1* | 9/2011 | Su | H04M 1/0291 |
| | | | 348/143 |
| 2011/0241943 A1* | 10/2011 | Shiu | B23K 1/0016 |
| | | | 343/700 MS |
| 2012/0002508 A1* | 1/2012 | Kristann | B63G 8/39 |
| | | | 367/153 |
| 2012/0181896 A1* | 7/2012 | Kornbluh | B64C 3/48 |
| | | | 310/300 |
| 2013/0161188 A1 | 6/2013 | Linsbod | |
| 2013/0314774 A1* | 11/2013 | Page | G02B 5/04 |
| | | | 359/361 |
| 2013/0328440 A1* | 12/2013 | Kornbluh | B64C 3/48 |
| | | | 310/300 |
| 2014/0225803 A1* | 8/2014 | Huerta | H01Q 21/0087 |
| | | | 343/872 |
| 2014/0373900 A1* | 12/2014 | Lamkin | G02B 5/04 |
| | | | 136/246 |
| 2015/0102212 A1* | 4/2015 | Ruh | G01J 1/0474 |
| | | | 250/237 R |
| 2015/0192958 A1 | 7/2015 | Sprenger et al. | |
| 2016/0226130 A1* | 8/2016 | Allore | H01Q 1/243 |
| 2016/0301139 A1* | 10/2016 | Lombardi | H01Q 1/243 |
| 2016/0303828 A1 | 10/2016 | Sriram et al. | |
| 2016/0338274 A1* | 11/2016 | Messner | A01G 25/16 |
| 2017/0069956 A1* | 3/2017 | Hill | H01Q 1/243 |
| 2017/0194999 A1* | 7/2017 | Rothbaum | H04B 1/3888 |
| 2018/0017995 A1* | 1/2018 | Gable | G06F 1/1656 |
| 2018/0048056 A1* | 2/2018 | Jow | H01Q 1/273 |
| 2018/0070465 A1* | 3/2018 | Cater | H01Q 1/24 |

FOREIGN PATENT DOCUMENTS

| | | |
|---|---|---|
| CN | 102609032 A | 5/2013 |
| KR | 101149177 B1 | 3/2013 |
| WO | 2015010648 A1 | 1/2015 |

OTHER PUBLICATIONS

Magsipoc, Brian, "OnePlus 2 Review", http://www.tomshardware.com/reviews/oneplus-2-oxygen,4463-2.html, Published on: Feb. 16, 2016, 13 pages.

* cited by examiner

THIN SECTION INTERLOCK GEOMETRY FOR MOLDING PLASTIC

BACKGROUND

As technology advances, computing devices have become increasingly portable, leading to the development of lighter, thinner, sleeker housings. Due to durability, protection, and aesthetics, these housings are commonly constructed from sections of metal or metal alloy. Many currently manufactured computing devices include an antenna. Particularly in portable computing devices, the antenna may be a slot antenna, the design of which requires that the sections of metal housing are not touching. To accommodate the antenna and an increasing number of complex components in the housing of the computing device while maintaining a high level of portability, engineers face a challenge in designing joints for the housings that provide electrical isolation between adjacent metal sections of the housing, are strong enough to endure device drops, are sufficiently thin to achieve a compact form factor, and which may be constructed using a wide variety of metal, ceramic, and plastic materials.

SUMMARY

To address the issues discussed above, a computing device comprising a housing, a metal strip, and a plastic interlock structure is provided. The housing may have a joint including adjacently arranged first and second metal sections separated by a void. The metal strip may be joined to a surface of one of the metal sections. The metal strip may have a hole formed therein, and the hole may include an undercut region. The plastic interlock structure may be positioned at least partially in the void. The metal strip may be embedded in the plastic interlock structure such that the hole, including the undercut region, is filled with plastic of the plastic interlock structure to strengthen the joint between the adjacently arranged metal sections of the housing. The plastic interlock structure may physically and electrically isolate the adjacent metal sections from one another to form an antenna that permits transmission of radio waves.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors of the subject application have discovered that forming secure joints between sections of housing on a computing device is constrained not only by available techniques and materials, but also by user desire to include increasing numbers of complex components in a sleek and portable housing of decreasing size that is resistant to breakage. Metal and metal alloys are commonly used to form sections of the housing, which can present a challenge when the computing device includes an internally mounted antenna, as metallic materials block radio signals. In some designs, the metal sections may be separated by a nonconductive material to form an antenna. Techniques such as nano molding technology (NMT) have been traditionally utilized to join the sections of housing to the nonconductive material. However, NMT is typically implemented on aluminum/aluminum alloys with thermoplastic materials that contain ester linkages.

Figure 1:
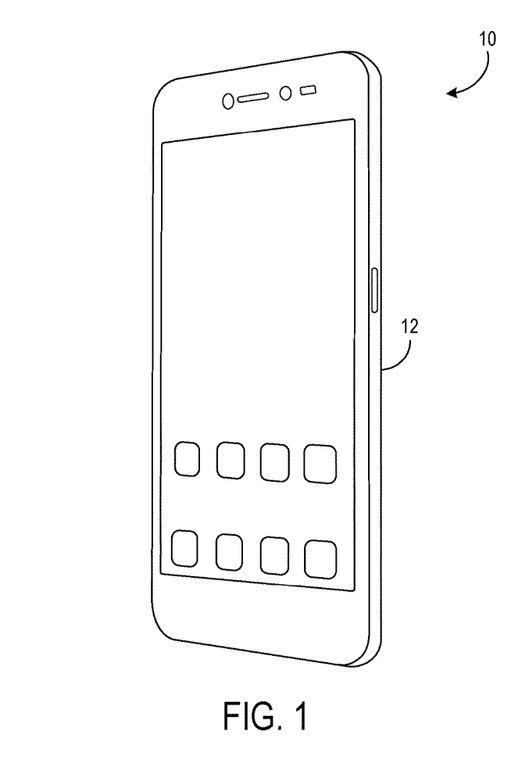
FIG. 1 shows a front perspective view of a computing device.
Figure 2:
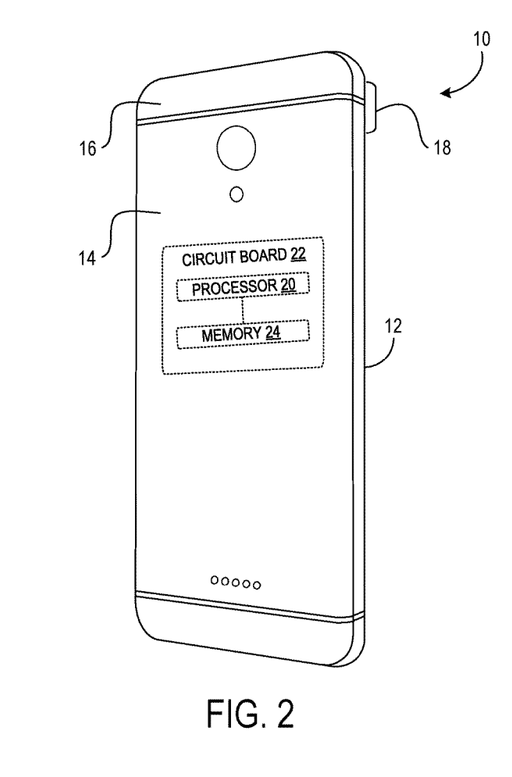
FIG. 2 shows a rear perspective view of the computing device of FIG. 1.

As illustrated in FIG. 1, to address the above identified issues a computing device 10 is provided. The computing device 10 may include a housing 12 having a joint 18 including adjacently arranged first and second metal sections 14, 16, as shown in FIG. 2. An external surface of the housing 12 in a region of the joint 18 between the first and second metal sections 14, 16 may be substantially planar. The computing device 10 may further include a processor 20 mounted on a circuit board 22 within the housing 12. Further, a memory 24 may be operatively coupled to the processor 20. While the computing device 10 illustrated in the example implementation of FIGS. 1 and 2 is depicted as a smart phone, it will be appreciated that the present disclosure may be implemented in other types of computing devices, such as a personal computer, gaming device, wearable computing device, or smart television.

Figure 3:
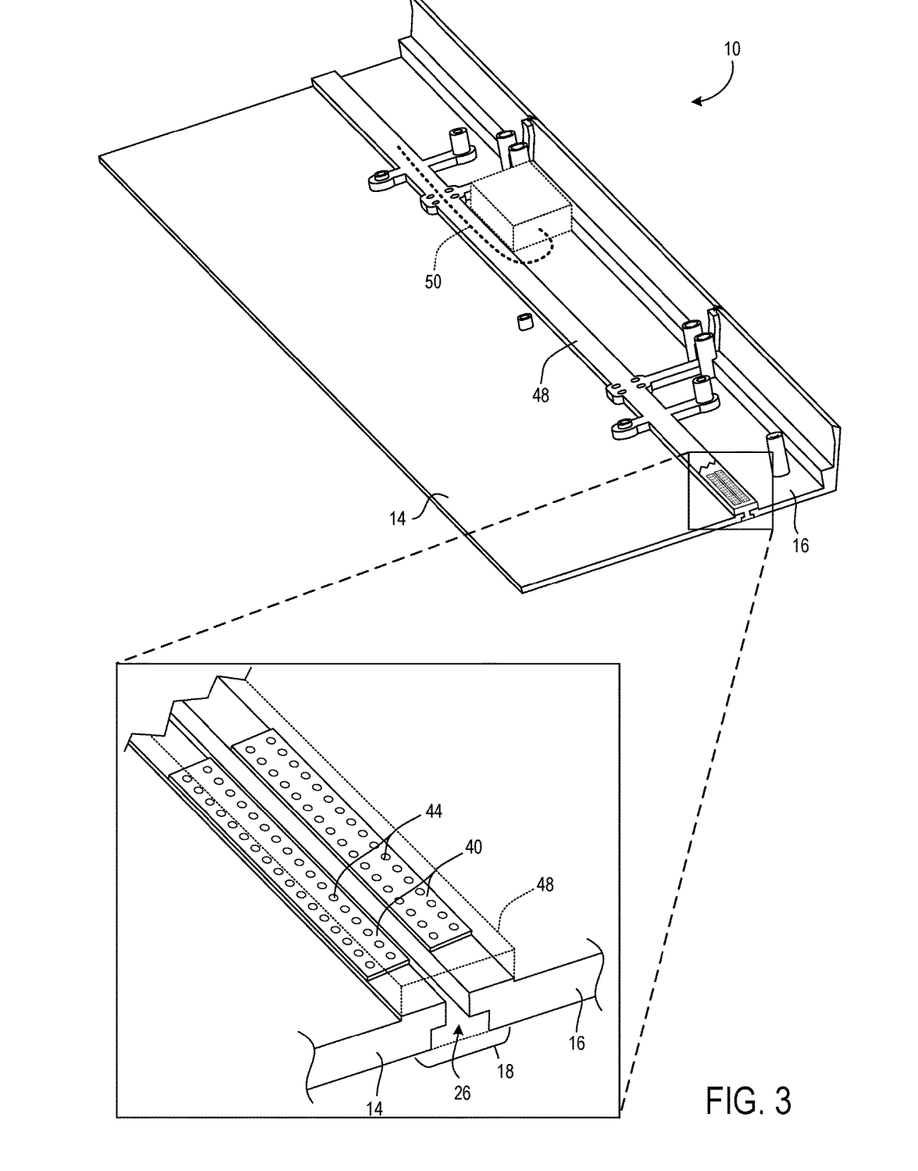
FIG. 3 shows a front perspective view of an inside of a housing of the computing device of FIG. 1 and includes an expanded view of a portion of the housing.

Turning now to FIG. 3, a front perspective view of an inside of the housing 12 of the computing device 10 of FIG. 1 is provided, including the region of the joint 18 between the first and second metal sections 14, 16. An expanded view of a cutaway portion of the housing 12 provides a detailed illustration of the joint 18.

Figure 4:
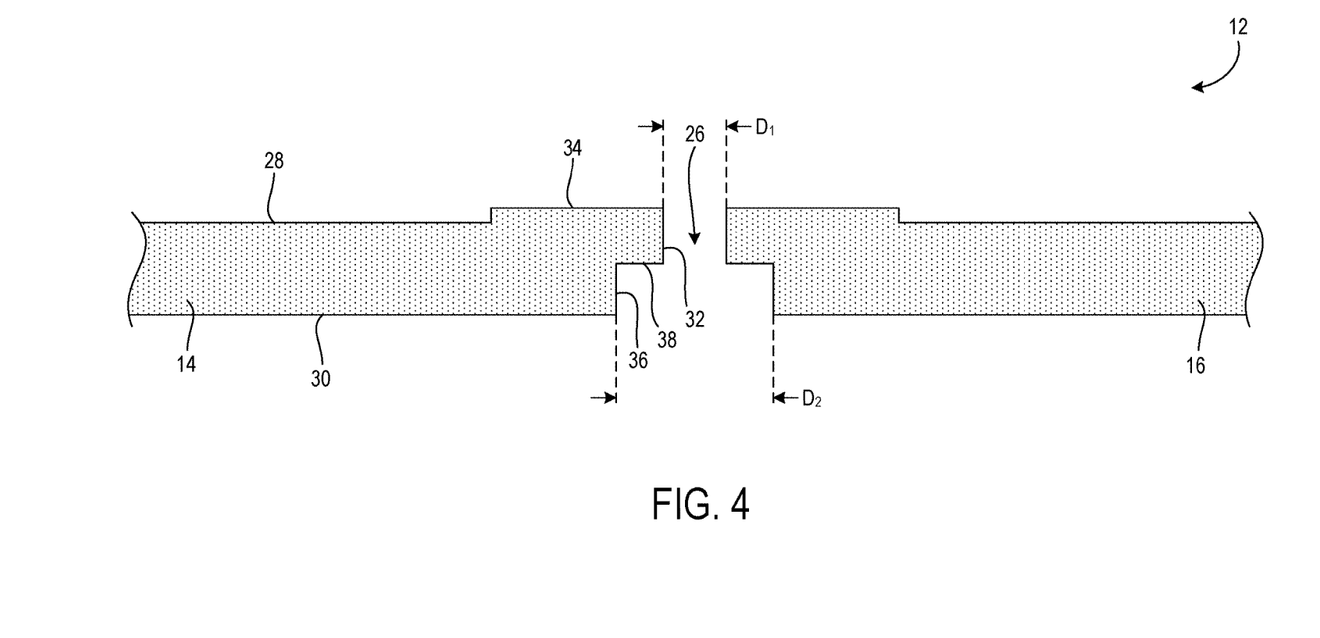
FIG. 4 shows a front view of the computer housing of FIG. 3.

Looking at the expanded view of FIG. 3 with reference to FIG. 4, the first and second metal sections 14, 16 may be separated by a void 26. As shown in FIG. 4, each metal section 14, 16 of the housing 12 may be formed to have a top surface 28, a bottom surface 30 that is parallel to the top surface 28, and an interior surface 32 connecting the top surface 28 and the bottom surface 30. The top surface 28 may include an extension 34 standing proud of the top surface 28 that is positioned adjacent the void 26. The interior surface 32 may include a step 36 that defines an overhang region 38 of the top surface 28, which is also positioned adjacent the void 26 in a plane parallel to and partially beneath the extension 34 standing proud of the top surface 28. While the example implementation illustrates each feature described above, it will be appreciated that not every feature may be present as shown. For example, the top surface 28 may be formed to be planar in the absence of an extension 34 standing proud. Additionally, the interior surface 32 may also be formed as a planar surface in the absence of the step 36 that defines the overhang region 38. Likewise, additional features not represented in the illustrated implementation may be present, such as an extension standing proud of the top surface that is positioned separate from the void 26.

As shown in FIG. 3, a plurality of metal strips 40 may be provided, each being joined to a surface of one of the metal sections 14, 16. While the illustrated example includes two metal strips 40, it will be appreciated that the quantity of metal strips 40 attached to the housing 12 may be more or fewer than two. While at least one metal strip 40 must be attached to at least one metal section of the housing 12, each individual metal section of the housing 12 may be devoid of metal strips 40, include a single metal strip 40, or include a plurality of metal strips 40.

Additionally or alternatively, the metal strip 40 may be a first metal strip 40a, and the computing device 10 may further include a second metal strip 40b. As shown in the illustrated implementation of FIG. 5, the first metal strip 40a may be joined to the extension 34 standing proud of the top surface 28 and positioned adjacent the void 26. The second metal strip 40b may be joined to the underside of the overhang region 38 of the top surface 28 of the same metal section of the housing 12 and positioned adjacent the void 26.

Figure 5:
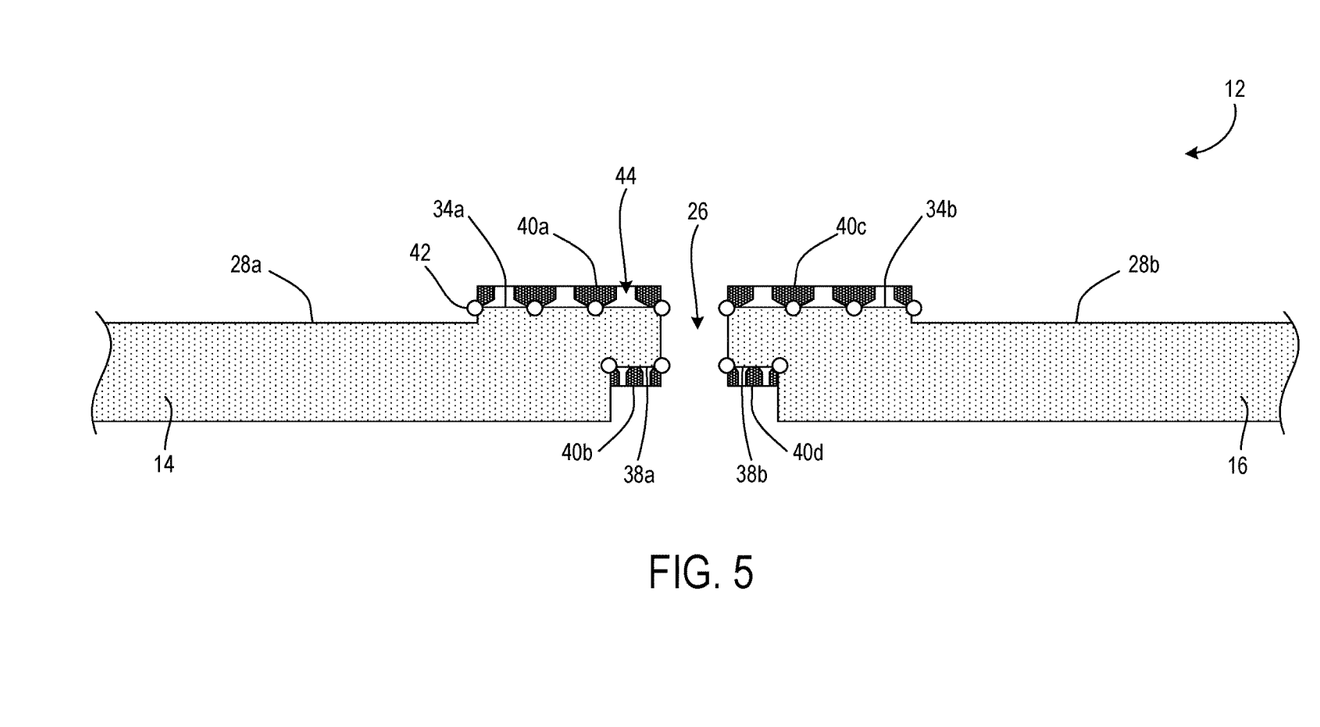
FIG. 5 shows a front view of the computer housing of FIG. 3, including metal strips.

Moreover, as illustrated in FIG. 5, the first and second metal strips 40a and 40b may be joined to the first metal section 14 of the housing 12, and a third metal strip 40c and a fourth metal strip 40d may be joined to the second metal section 16 of the housing 12.

Further, as illustrated in FIG. 5, the metal strips 40 may be positioned at a location selected from the group consisting of the extension 34a standing proud of the first metal section 14, the underside of the overhang region 38a of the first metal section 14, the extension 34b standing proud of the second metal section 16, or the underside of the overhang region 38b of the second metal section 16.

In the example implementation shown in FIG. 5, the first and second metal strips 40a, 40b may be joined to the extension 34a standing proud of the top surface 28a and to the underside of the overhang region 38a, respectively. As discussed below, each metal strip may include holes 44, which are depicted as through holes in the illustrated implementation. The third metal strip 40c may be joined to the extension 34b standing proud of the top surface 28b of the second metal section 16 and positioned adjacent the void 26 opposite the first metal strip 40a. Similarly, the fourth metal strip 40d may be joined to the underside of the overhang region 38b of the top surface 28b of the second metal section 16 and positioned adjacent the void 26 opposite the second metal strip 40b. The provided example illustrates the metal strips 40 joined to the extension 34 standing proud of the top surface or to the underside of the overhang region 38. However, it will be appreciated that a metal strip 40 may be positioned on a surface of a metal section in an alternate location to those described above, such as on the interior surface 32 or the inside of the step 36 of the first or second metal sections 14, 16 of the housing 12.

In the depicted implementation, the metal strips 40 are positioned adjacent the void 26. However, it will be appreciated that the metal strips 40 may be arranged at an alternate location separate from the void 26, such as on the top surface 28 of a metal section of the housing 12.

The example implementation provided in FIG. 5 illustrates that welds 42 are provided to join the metal strips 40a, 40b, 40c, 40d to the housing 12. The welds 42 are preferably formed by laser welding. However, it will be understood that another mechanism may be provided to secure the metal strips 40 to the metal sections 14, 16 of the housing 12, such as adhesives or fasteners.

In any of the implementations described herein, the metal strips 40 and the metal sections 14, 16 of the housing 12 may be formed of magnesium or a magnesium alloy. In addition to being lightweight, strong, and durable, magnesium and its alloys also effectively dissipate heat and dampen shock and vibrations, thereby making them advantageous materials for use in housings of computing devices. Alternatively, it will be appreciated that the metal strips 40 and the metal sections 14, 16 of the housing 12 of the computing device 10 of any of the implementations described herein may be formed of any sufficiently durable material, such as aluminum or the like.

Figures 7, 8A, 8B, 8C, 8D:
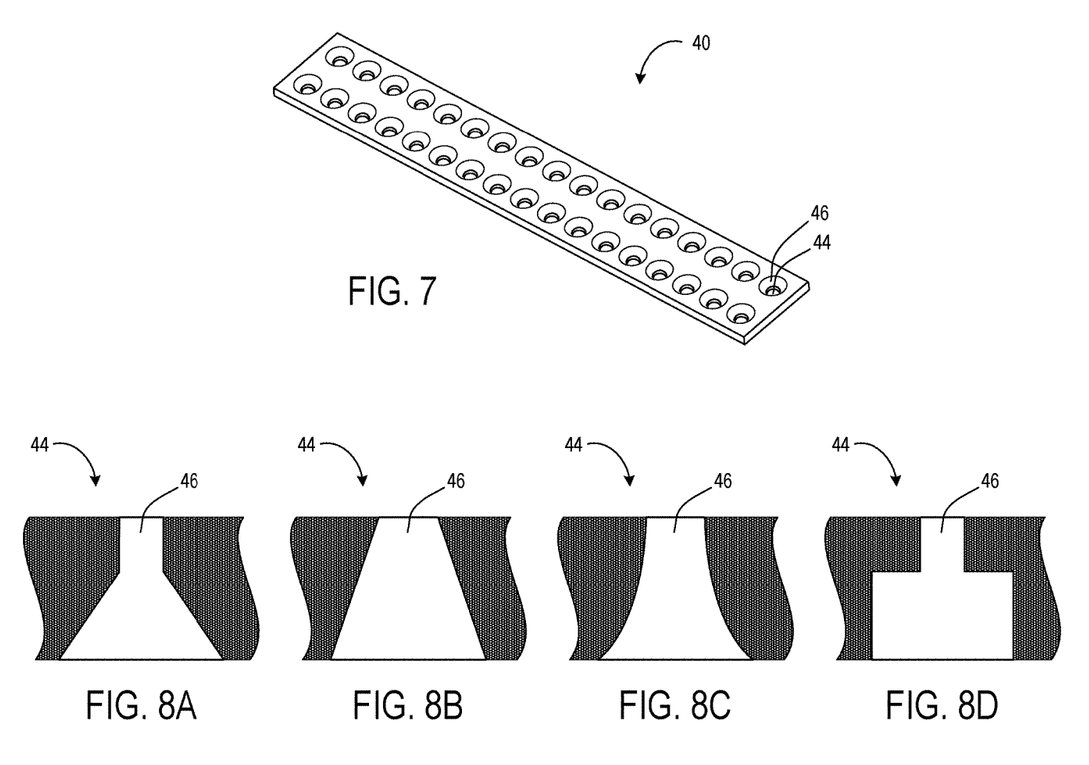
FIG. 7 shows a bottom perspective view of a metal strip of the computing device of FIG. 1.
FIGS. 8A-8D show front views of undercut regions of the holes in the metal strip of FIG. 7.

As illustrated in FIG. 3, the metal strips 40 may have a plurality of holes 44 formed therein. Turning to FIG. 7, it is further illustrated that the holes 44 in the metal strips 40 may each have an undercut region 46. Moreover, each hole 44 may be a through hole formed in the metal strip 40 that bottoms at the surface of the metal section to which it is joined. As shown, the through hole may have an undercut region 46, which is bordered by the surface of the metal section. FIG. 7 illustrates a metal strip 40 in which the through hole is one of a plurality of through holes. In the illustrated implementation, each through hole may have a corresponding undercut region 46, and the plurality of through holes may be arranged in a periodic pattern along the metal strip 40. The depicted pattern includes two rows of holes, although a single row or multiple rows may be provided. The holes may also be staggered in a zigzag pattern, or provided in other patterns that distribute the holes along the metal strips.

FIGS. 8A-8D provide front views of the holes 44, illustrating a variety of shapes in which the undercut regions 46 of the through holes may be formed. For example, the undercut regions 46 may have a shape selected from the group consisting of funnel (see FIG. 8A), dovetail (see FIG. 8B), bell (see FIG. 8C), and upside down T (see FIG. 8D). Alternatively, the shape of the undercut region 46 may be formed in a configuration that is not illustrated, such as a threaded cylinder or a plus sign (+). The undercut regions 46 of the through holes may be formed by exclusion molding, etching, pressing, or rolling. Alternatively, another technique such as layering may be utilized to form the undercut regions 46. While the illustrated implementations shown in FIGS. 7 and 8A-8D depict a through hole, it will be appreciated that the through hole may be implemented in any of the implementations described herein as a hole 44 in the metal strip 40 that does not bottom at the surface of the metal section to which it is joined.

Figure 6:
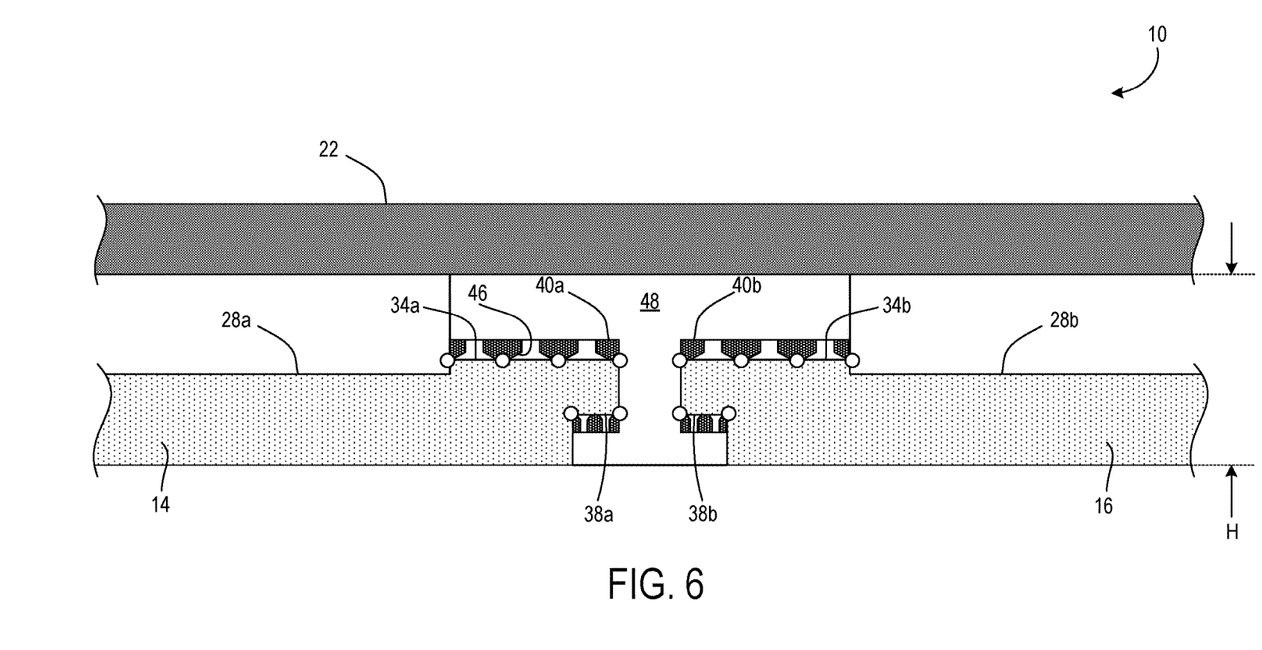
FIG. 6 shows a front view of a section of the computing device of FIG. 1.

Looking now at FIG. 6, a plastic interlock structure 48 may be positioned at least partially in the void 26. As shown in FIG. 6 with reference to the cutaway in FIG. 3, the metal strips 40 may be embedded in the plastic interlock structure 48. In the illustrated configuration, the hole 44, including the undercut region 46, may be filled with plastic of the plastic interlock structure 48. As discussed above and shown in FIG. 5, the metal strip 40 may be a first metal strip 40a joined to the extension 34a standing proud of the top surface 28a of the first metal section 14. Additionally or alternatively, the computing device 10 may further include a second metal strip 40b. In this example implementation of FIG. 6, the second metal strip 40*b* may be joined to the extension 34*b* standing proud of the top surface 28*b* of the second metal section 16. The plastic interlock structure 48 may be configured to fill the void 26 between two adjacently arranged metal sections 14, 16 of the housing 12. As shown, the plastic interlock structure 48 fills the entire void 26 between the first and second metal sections 14, 16 of the housing 12, including a wider area at a base of the void 26 formed by the overhang regions 38*a*, 38*b* of the first and second metal sections 14, 16. The plastic interlock structure 48 may be further configured to extend beyond the void 26 to cover at least a portion of the extensions 34*a*, 34*b* standing proud of the top surfaces 28*a*, 28*b* of the two adjacently arranged metal sections 14, 16. In this arrangement, the plastic interlock structure 48 may encase the first and second metal strips 40*a*, 40*b* joined to each of the two adjacently arranged metal sections 14, 16.

To position the plastic interlock structure 48 such that it fills the void 26 and the undercut region 46 of the through holes, the plastic interlock structure 48 may be injection molded on to the metal strip 40 that is joined to a metal section of the housing 12. As illustrated in FIG. 6, the first and second metal sections 14, 16 of the housing 12, metal strips 40, and plastic interlock structure 48 may be stacked in this order in a stack. In the illustrated implementation, a height H of the stack may be in a range of 0.5 mm to 2.0 mm. However, it will be appreciated that the height of the stack of the metal housing 14, 16, metal strip 40, and plastic interlock structure 48 may be lower or higher than the provided example.

In any of the implementations described herein, the plastic interlock structure 48 preferentially includes plastic formed of a material selected from the group consisting of polyetherimide, polybutylene terephthalate, polyether ether ketone, polycarbonate, and polyamide. However, the plastic interlock structure 48 of any of the implementations described herein may be formed of any sufficiently injection moldable thermoplastic material, such as polyphenylene sulfide or polyphthalamide.

Turning back to FIG. 3, the example implementation illustrates that the first and second metal sections 14, 16 are positioned adjacent to, and separated by, the plastic interlock structure 48. Being formed of a plastic material as discussed above, the plastic interlock structure 48 is a nonconductive material. Thus, the placement of the plastic interlock structure 48 between the first and second metal sections 14, 16 may physically and electrically isolate the adjacent metal sections from one another to form an antenna that is configured to transmit and/or receive radio waves.

As shown in FIG. 4, the width of the plastic interlock structure 48 spans a distance $D_1$ between the extensions 34 standing proud of the top surfaces 28 of the first and second metal sections 14, 16 may be within a range of 0.1 mm to 5.0 mm. Similarly, a distance $D_2$ that defines a width of the plastic interlock structure 48 between the bottom surfaces 30 of the first and second metal sections 14, 16 may be within a range of 0.1 mm to 5.0 mm. In the illustrated implementation, $D_1$ is less than $D_2$ to facilitate interlocking. However, it will be appreciated that in alternate implementations, $D_1$ may be equal to or greater than $D_2$.

While a typical implementation is illustrated as a computing device 10 with a slot antenna, an alternate implementation may include an internally mounted antenna 50, as depicted by the dotted line in FIG. 3. When an internally mounted antenna 50 is included, it will be appreciated that the distance between the first and second metal sections 14, 16 may be within a range of 5.0 mm to 10.0 mm to permit radio waves to pass through the housing 12 to the internally mounted antenna 50.

In any of the implementations described herein, the configuration of metal strips 40 joined to the first and second metal sections 14, 16 and embedded in the plastic interlock structure 48 that fills the void 26 between the first and second metal sections 14, 16 serves to thereby strengthen the joint 18 between the adjacently arranged metal sections 14, 16 of the housing 12. The inclusion of the metal strips 40 in the joint 18 contribute additional infrastructure to the housing 12 of the computing device 10 to prevent breakage or fracture of the housing 12 in the event that the computing device 10 is dropped or experiences an impact event.

Figure 9:
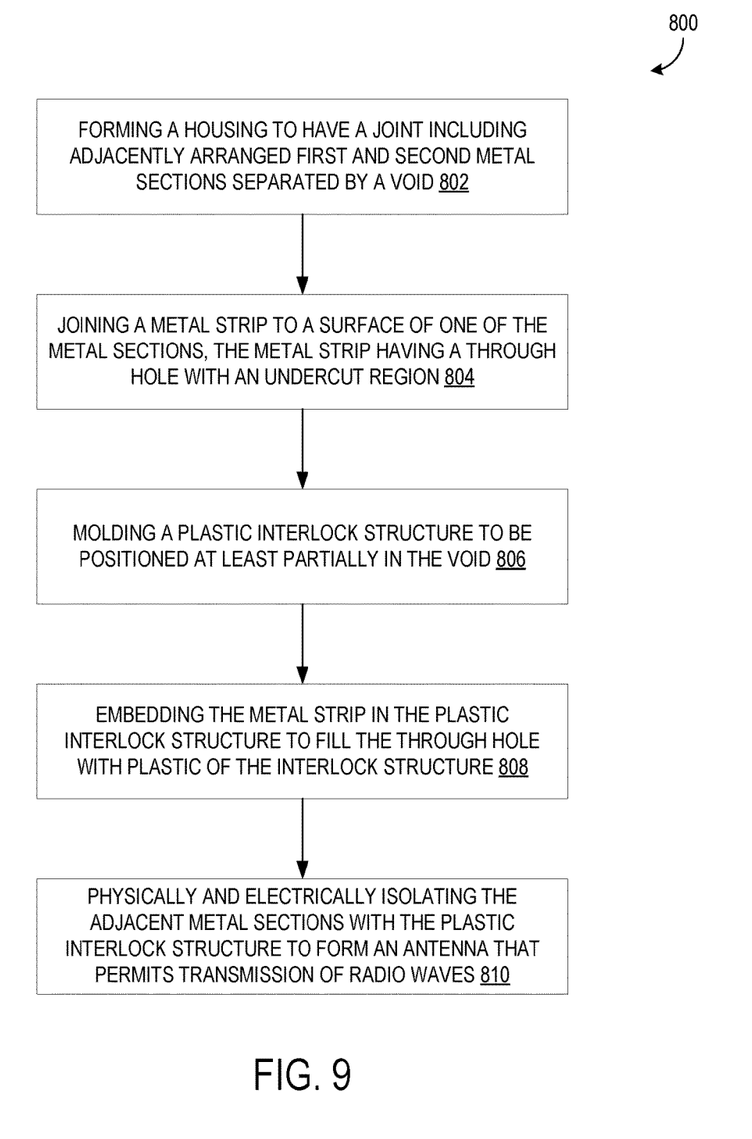
FIG. 9 shows a flowchart of a method for a housing of a computing device, according to one implementation of the present disclosure.

FIG. 9 shows an example method 800 according to an implementation of the present description. At step 802, the method 800 may include forming a housing to have a joint including adjacently arranged first and second metal sections separated by a void.

Proceeding from step 802 to step 804, the method may include joining a metal strip to a surface of one of the metal sections, the metal strip having a through hole with an undercut region. As discussed above, the through hole may bottom at the surface of the metal section to which it is joined, and the undercut region may be bordered by the surface.

Advancing from step 804 to step 806, the method may include molding a plastic interlock structure to be positioned at least partially in the void. As described above in an example implementation, the plastic interlock structure may be configured to fill the void between two adjacently arranged metal sections of housing, including a wider area at the base of the void that is formed by the overhang regions of the first and second metals sections. The plastic interlock structure may be further configured to over at least a portion of the extensions standing proud of the top surfaces of the metal sections and encase the metal strips joined to the metal sections.

Continuing from step 806 to step 808, the method may include embedding the metal strip in the plastic interlock structure to fill the through hole with plastic of the interlock structure. As discussed above, the undercut region of the through hole may also be filled with the material of the plastic interlock structure. The configuration of embedding a metal strip, which is joined to a metal section of the housing, in the plastic interlock structure strengthens the joint between adjacently arranged metal sections of the housing.

Proceeding from step 808 to step 810, the method may include physically and electrically isolating the adjacent metal sections with the plastic interlock structure to form an antenna that permits transmission of radio waves. As discussed above, the plastic interlock structure is nonconductive. Thus, arranging the plastic interlock structure between adjacent metal sections of the housing physically and electrically isolates the metal sections and enables the metal sections and slot to function as a slot antenna capable of transmitting and/or receiving radio waves.

Figure 10:
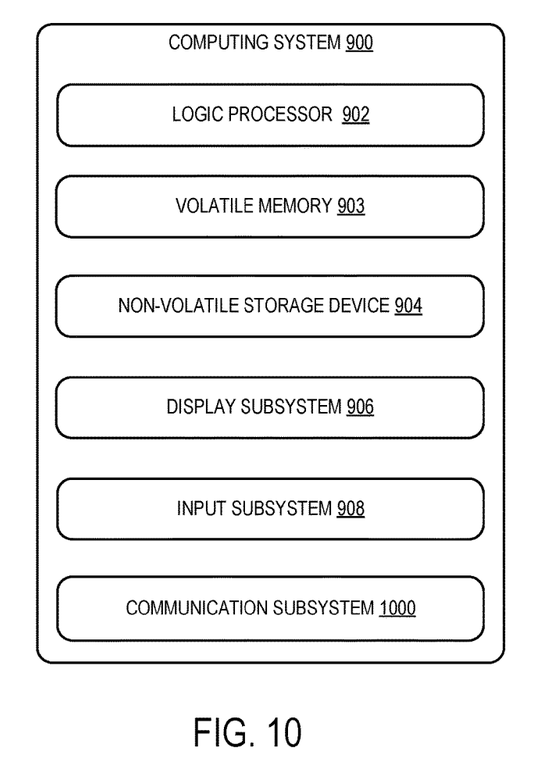
FIG. 10 shows an example computing system according to an implementation of the present disclosure.

The computing device 10 is illustrated as a smart phone. However, the computing device 10 may take a variety of other forms. A computing system 900 is generally illustrated in FIG. 10, which may serve as computing device 10 of FIGS. 1 and 2. Computing system 900 may be in the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 900 includes a logic processor 902, volatile memory 903, and a non-volatile storage device 904. Computing system 900 may optionally include a display subsystem 906, input subsystem 908, communication subsystem 1000, and/or other components not shown in FIG. 10.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. It will be appreciated that random access memory may also be provided in non-volatile memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by non-volatile storage device 904. The visual representation may take the form of a graphical user interface (GUI). Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 900 to send and/or receive messages to and/or from other devices via a network such as the Internet.

The following paragraphs provide additional support for the claims of the subject application. One aspect provides a computing device comprising a housing having a joint including adjacently arranged first and second metal sections separated by a void, a metal strip joined to a surface of one of the metal sections, and a plastic interlock structure positioned at least partially in the void. The metal strip may have a hole formed therein, the hole having an undercut region. The metal strip may be embedded in the plastic interlock structure such that the hole, including the undercut region, may be filled with plastic of the plastic interlock structure to thereby strengthen the joint between the adjacently arranged metal sections of the housing. The plastic interlock structure may physically and electrically isolate the adjacent metal sections from one another to form an antenna that is configured to transmit and/or receive radio waves. In this aspect, additionally or alternatively, the hole may be a through hole formed in the metal strip that bottoms at the surface of the metal section to which it is joined, the through hole having an undercut region bordered by the surface. In this aspect, additionally or alternatively, each metal section of the housing may comprise a top surface including an extension standing proud of the top surface and positioned adjacent the void, a bottom surface parallel to the top surface, and an interior surface connecting the top surface and the bottom surface and positioned adjacent the void, the interior surface including a step that defines an overhang region of the top surface. In this aspect, additionally or alternatively, the metal strip may be positioned adjacent the void, and the metal strip may be positioned at a location selected from the group consisting of the extension standing proud of the first metal section, the underside of the overhang region of the first metal section, the extension standing proud of the second metal section, or the underside of the overhang region of the second metal section. In this aspect, additionally or alternatively, the metal strip may be a first metal strip, and the computing device may further include a second metal strip. The first metal strip may be joined to the extension standing proud of the top surface and positioned adjacent the void, and the second metal strip may be joined to the underside of the overhang region of the top surface and positioned adjacent the void. In this aspect, additionally or alternatively, the first and second metal strips may be joined to the first metal section of the housing, and a third metal strip and a fourth metal strip may be joined to the second metal section of the housing. The third metal strip may be joined to the extension standing proud of the top surface and positioned adjacent the void opposite the first metal strip, and the fourth metal strip may be joined to the underside of the overhang region of the top surface and positioned adjacent the void opposite the second metal strip. In this aspect, additionally or alternatively, the metal strip may be a first metal strip, and the computing device may further include a second metal strip. The plastic interlock structure may be configured to fill the void between two adjacently arranged metal sections of housing, including a wider area at a base of the void formed by the overhang regions of the first and second metal sections, and extend beyond the void to cover at least a portion of the extensions standing proud of the top surfaces of the two adjacently arranged metal sections, thereby encasing the first and second metal strips joined to each of the two adjacently arranged metal sections. In this aspect, additionally or alternatively, the through hole may be one of a plurality of through holes each having a corresponding undercut region, the plurality of through holes being arranged in a periodic pattern along the metal strip. In this aspect, additionally or alternatively, the undercut regions of the through holes may have a shape selected from the group consisting of funnel, dovetail, bell, and upside down T. In this aspect, additionally or alternatively, the undercut regions of the through holes may be formed by exclusion molding, etching, pressing, or rolling. In this aspect, additionally or alternatively, welds may be provided to join the metal strip to the housing. In this aspect, additionally or alternatively, an external surface of the housing in a region of the joint may be substantially planar. In this aspect, additionally or alternatively, the housing may be formed of magnesium or a magnesium alloy, and the metal strip may be formed of magnesium or a magnesium alloy. In this aspect, additionally or alternatively, the plastic interlock structure may be injection molded on to the metal strip, and may include plastic formed of a material selected from the group consisting of polyetherimide, polybutylene terephthalate, polyether ether ketone, polycarbonate, and polyamide. In this aspect, additionally or alternatively, the metal housing, metal strip, and plastic interlock structure may be stacked in this order in a stack, and a height of the stack may be in a range of 0.5 mm to 2.0 mm. In this aspect, additionally or alternatively, the computing device may further comprise a processor mounted on a circuit board within the housing and a memory operatively coupled to the processor.

Another aspect provides a method for a computing device comprising forming a housing to have a joint including adjacently arranged first and second metal sections separated by a void, joining a metal strip to a surface of one of the metal sections, the metal strip having a hole formed therein that bottoms at the surface, the hole having an undercut region bordered by the surface, molding a plastic interlock structure to be positioned at least partially in the void, embedding the metal strip in the plastic interlock structure such that the hole, including the undercut region, is filled with plastic of the plastic interlock structure, to thereby strengthen the joint between the adjacently arranged metal sections of the housing, and physically and electrically isolating the adjacent metal sections from one another with the plastic interlock structure to form an antenna that is configured to transmit and/or receive radio waves. In this aspect, additionally or alternatively, the method may further comprise injection molding the plastic interlock structure on to the metal strip and including plastic formed of a material selected from the group consisting of polyetherimide, polybutylene terephthalate, polyether ether ketone, polycarbonate, and polyamide. In this aspect, additionally or alternatively, the method may further comprise forming each section of metal housing to include a top surface including an extension standing proud of the top surface and positioned adjacent the void, a bottom surface parallel to the top surface, and an interior surface connecting the top surface and the bottom surface and positioned adjacent the void, wherein the interior surface including a step that defines an overhang region of the top surface, positioning the metal strip adjacent the void, and joining the metal strip to the housing at a location selected from the group consisting of the extension standing proud of the first metal section, the underside of the overhang region of the first metal section, the extension standing proud of the second metal section, or the underside of the overhang region of the second metal section.

Another aspect provides a computing device comprising a housing having a joint including adjacently arranged first and second metal sections separated by a void, a first metal strip formed of magnesium and joined to a surface of one of the first metal section adjacent the void, a second metal strip formed of magnesium and joined to a surface of the second metal section adjacent the void opposite the first metal strip, and a plastic interlock structure positioned at least partially in the void. The first metal strip may have a hole formed therein, the hole having an undercut region, and the second metal strip may have a hole formed therein, the hole having an undercut region. The first and second metal strips may be embedded in the plastic interlock structure such that the holes in the first and second metal strips, including the undercut regions, are filled with plastic of the plastic interlock structure.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a housing having a joint including adjacently arranged first and second metal sections separated by a void;
a metal strip joined to a surface of one of the metal sections, the metal strip having a hole formed therein, the hole having an undercut region;
a plastic interlock structure positioned at least partially in the void; wherein
the metal strip is embedded in the plastic interlock structure such that the hole, including the undercut region, is filled with plastic of the plastic interlock structure, to thereby strengthen the joint between the adjacently arranged metal sections of the housing; and
the plastic interlock structure physically and electrically isolates the adjacent metal sections from one another to form an antenna that is configured to transmit and/or receive radio waves.

2. The computing device according to claim 1, wherein the hole is a through hole formed in the metal strip that bottoms at the surface of the metal section to which it is joined, the through hole having an undercut region bordered by the surface.

3. The computing device according to claim 1, wherein each metal section of the housing comprises:
a top surface including an extension standing proud of the top surface and positioned adjacent the void;
a bottom surface parallel to the top surface; and
an interior surface connecting the top surface and the bottom surface and positioned adjacent the void, the interior surface including a step that defines an overhang region of the top surface.

4. The computing device according to claim 3, wherein the metal strip is positioned adjacent the void; and
the metal strip is positioned at a location selected from the group consisting of the extension standing proud of the first metal section, the underside of the overhang region of the first metal section, the extension standing proud of the second metal section, or the underside of the overhang region of the second metal section.

5. The computing device according to claim 4, wherein the metal strip is a first metal strip;
the computing device further includes a second metal strip;
the first metal strip is joined to the extension standing proud of the top surface and positioned adjacent the void; and
the second metal strip is joined to the underside of the overhang region of the top surface and positioned adjacent the void.

6. The computing device according to claim 5, wherein the first and second metal strips are joined to the first metal section of the housing, and
a third metal strip and a fourth metal strip are joined to the second metal section of the housing, wherein
the third metal strip is joined to the extension standing proud of the top surface and positioned adjacent the void opposite the first metal strip; and
the fourth metal strip is joined to the underside of the overhang region of the top surface and positioned adjacent the void opposite the second metal strip.

7. The computing device according to claim 4, wherein the metal strip is a first metal strip;
the computing device further includes a second metal strip; and
the plastic interlock structure is configured to:
fill the void between two adjacently arranged metal sections of housing, including a wider area at a base of the void formed by the overhang regions of the first and second metal sections; and
extend beyond the void to cover at least a portion of the extensions standing proud of the top surfaces of the two adjacently arranged metal sections, thereby encasing the first and second metal strips joined to each of the two adjacently arranged metal sections.

8. The computing device according to claim 2, wherein the through hole is one of a plurality of through holes each having a corresponding undercut region, the plurality of through holes being arranged in a periodic pattern along the metal strip.

9. The computing device according to claim 8, wherein the undercut regions of the through holes have a shape selected from the group consisting of funnel, dovetail, bell, and upside down T.

10. The computing device according to claim 8, wherein the undercut regions of the through holes are formed by exclusion molding, etching, pressing, or rolling.

11. The computing device according to claim 1, wherein welds are provided to join the metal strip to the housing.

12. The computing device according to claim 1, wherein an external surface of the housing in a region of the joint is substantially planar.

13. The computing device according to claim 1, wherein the housing is formed of magnesium or a magnesium alloy; and
the metal strip is formed of magnesium or a magnesium alloy.

14. The computing device according to claim 1, wherein the plastic interlock structure is injection molded on to the metal strip, and includes plastic formed of a material selected from the group consisting of polyetherimide, polybutylene terephthalate, polyether ether ketone, polycarbonate, and polyamide.

15. The computing device according to claim 1, wherein the metal housing, metal strip, and plastic interlock structure are stacked in this order in a stack, and
a height of the stack is in a range of 0.5 mm to 2.0 mm.

16. The computing device according to claim 1, further comprising:
a processor mounted on a circuit board within the housing; and
a memory operatively coupled to the processor.

17. A method for a computing device, the method comprising:
forming a housing to have a joint including adjacently arranged first and second metal sections separated by a void;
joining a metal strip to a surface of one of the metal sections, the metal strip having a hole formed therein that bottoms at the surface, the hole having an undercut region bordered by the surface;
molding a plastic interlock structure to be positioned at least partially in the void;
embedding the metal strip in the plastic interlock structure such that the hole, including the undercut region, is filled with plastic of the plastic interlock structure, to thereby strengthen the joint between the adjacently arranged metal sections of the housing; and
physically and electrically isolating the adjacent metal sections from one another with the plastic interlock structure to form an antenna that is configured to transmit and/or receive radio waves.

18. The method for a computing device according to claim 17, the method further comprising:
injection molding the plastic interlock structure on to the metal strip, and
including plastic formed of a material selected from the group consisting of polyetherimide, polybutylene terephthalate, polyether ether ketone, polycarbonate, and polyamide.

19. The method for a computing device according to claim 17, the method further comprising:
forming each section of metal housing to include:
a top surface including an extension standing proud of the top surface and positioned adjacent the void;
a bottom surface parallel to the top surface; and
an interior surface connecting the top surface and the bottom surface and positioned adjacent the void, the interior surface including a step that defines an overhang region of the top surface; and positioning the metal strip adjacent the void and joining the metal strip to the housing at a location selected from the group consisting of the extension standing proud of the first metal section, the underside of the overhang region of the first metal section, the extension standing proud of the second metal section, or the underside of the overhang region of the second metal section.

20. A computing device, comprising:

a housing having a joint including adjacently arranged first and second metal sections separated by a void;

a first metal strip formed of magnesium and joined to a surface of one of the first metal section adjacent the void, the first metal strip having a hole formed therein, the hole having an undercut region;

a second metal strip formed of magnesium and joined to a surface of the second metal section adjacent the void opposite the first metal strip, the second metal strip having a hole formed therein, the hole having an undercut region; and a plastic interlock structure positioned at least partially in the void;

wherein the first and second metal strips are embedded in the plastic interlock structure such that the holes in the first and second metal strips, including the undercut regions, are filled with plastic of the plastic interlock structure.

* * * * *